Sept. 20, 1955  C. B. KING  2,718,176
METHOD OF CUTTING CLUTCHES AND COUPLINGS
Filed April 20, 1951  2 Sheets-Sheet 1

*INVENTOR.*
CHARLES B. KING
BY
*Richard W. Treverton*
*ATTORNEY*

Sept. 20, 1955  C. B. KING  2,718,176
METHOD OF CUTTING CLUTCHES AND COUPLINGS
Filed April 20, 1951  2 Sheets-Sheet 2

INVENTOR.
CHARLES B. KING
BY
*Richard W. Treverton*
ATTORNEY

United States Patent Office 2,718,176
Patented Sept. 20, 1955

2,718,176

METHOD OF CUTTING CLUTCHES AND COUPLINGS

Charles B. King, Brighton, N. Y., assignor to The Gleason Works, Rochester, N. Y., a corporation of New York Application April 20, 1951, Serial No. 222,103

3 Claims. (Cl. 90—9.4)

The present invention relates to an improved method of making tooth faced clutch and coupling members of the general type disclosed in Patents Nos. 2,384,582 and 2,388,456.

The face mill cutters employed for making such members preferably have their side cutting profiles disposed at an acute angle, known as the pressure angle, to the cutter axis, in order that the cutter blades may be relieved in an axial direction back of their cutting edges, this mode of relief being preferred inasmuch as with it the cutter diameter does not change when the blades are sharpened. The pressure angle of a cutter blade side profile is considered to be positive when the profile extends in a direction such that it will cut if the cutter is fed axially into the work. When using such an axially relieved cutter in making a clutch or coupling member of the general kind referred to and that has its tooth profiles extending substantially in an axial direction, it is necessary to set the cutter axis at an angle to the work axis; and it has been the practice to provide a relative feed motion between the cutter and the work along the cutter axis.

The clearance side profile of the cutter (the side opposite the side cutting profile) is disposed at a small negative pressure angle in order that it will not interfere with the work. As a result, the width of the tip profile of the cutter is decreased as the blades are sharpened back. If a fin at the bottom of the tooth spaces is to be avoided this profile width must be at least one half that of the tooth space bottom at its widest point.

Because of the angularity of the work axis to the cutter axis along which the feed motion is effected, the necessity for substantial cutter tip profile width definitely limits the depth of cut for a given tooth space width. Furthermore the life of the cutters is limited to whatever number of blade sharpenings reduces the tip profile to a width just sufficient to sweep half of the tooth space bottom at its widest point.

One object of the present invention is to provide a method that will enable the cutting of tooth spaces that are substantially deeper in relation to their width than has been possible with the methods heretofore practiced. Another object is the provision of a method which will greatly extend cutter life by enabling the use of blades that have a wider initial tip profile and that can therefore be sharpened a greater number of times before being reduced to the minimum useful width.

The method of the present invention, which accomplishes these objects, employs a face mill cutter that has, as before, a tip cutting profile for cutting the tooth space bottoms, and a side cutting profile with a positive pressure angle for cutting both sides of the teeth. The clearance side profile is disposed at a much larger negative pressure angle than before, the axis of the cutter is disposed to intersect the axis of the work at an acute angle, and a relative feed motion of the cutter and the work is effected substantially in the direction that the clearance side profile extends in the plane common to the cutter axis and the work axis. More specifically the feed motion in this common plane is in a direction that is inclined to the axis of the work in the same sense as, but to a lesser degree than, the cutter axis, and that is at an angle to the cutter axis equal to the negative pressure angle of the clearance side profile less a clearance angle.

The objects and advantages of the invention will appear more clearly from the following description made with reference to the drawings, wherein.

Figure 1:
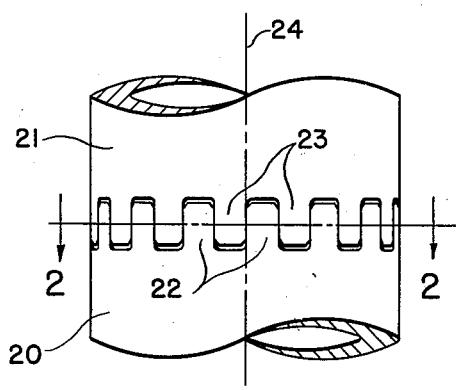
Fig. 1 is a side elevation of a face coupling made in accordance with the present invention.
Figure 2:
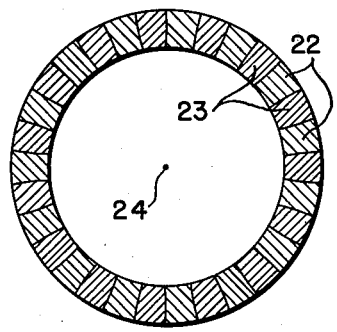
Fig. 2 is a cross-section taken as indicated by line 2—2 of Fig. 1.
Figure 3:
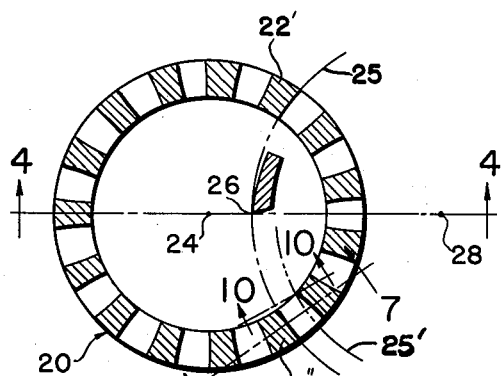
Fig. 3 is a diagram in the plane of Fig. 2 showing the relationship between the cutter and one of the coupling members, this being the member with concave tooth flanks.
Figure 5:
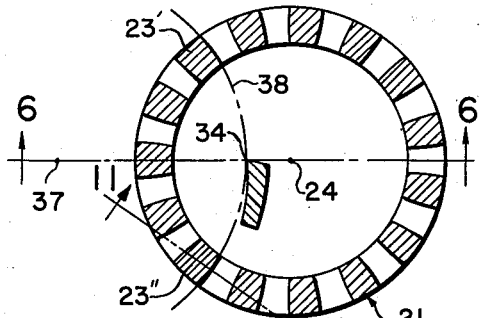
Figs. 5 and 6 are diagrams similar to Figs. 3 and 4, respectively, showing the relationship of the cutter and the other member of the coupling, this being the member with convex tooth flanks.
Figure 4:
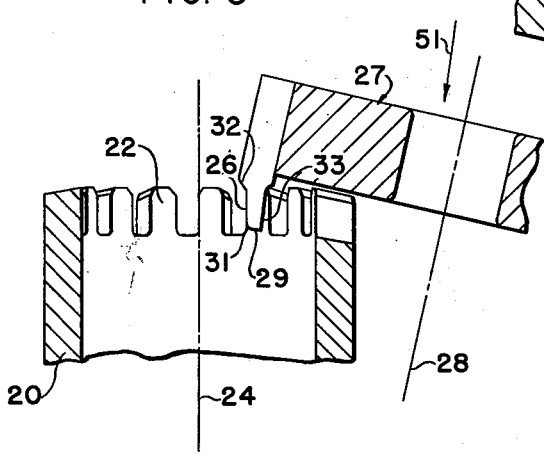
Fig. 4 is a diagram in a plane at right angles to Fig. 3, and as indicated by line 4—4 of Fig. 3.
Figure 6:
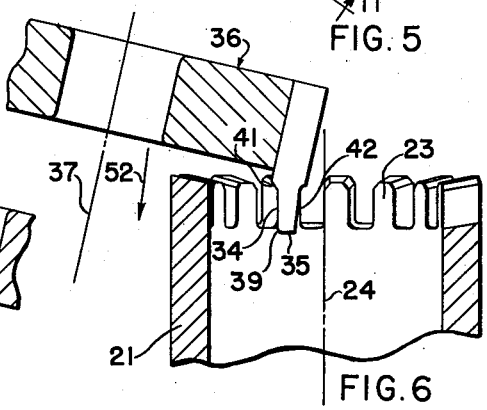

Shown in Figs. 1 and 2 is a pair of face coupling members, 20 and 21, having interengaging teeth 22 and 23, respectively, extending in a radial direction. In the form shown, the flank profiles of the teeth are substantially straight and extend in the direction of the axis 24 of the members. The tooth flanks considered lengthwise, that is radially, are of circular arc form, being cut with a face mill cutter whose side cutting edge or edges cuts opposite sides of spaced teeth of one coupling member in one operation. Thus, as shown in Figs. 3 and 4, the opposite concave sides of spaced teeth 22' and 22" of member 20 simultaneously lie in the circular path 25 of the outer side cutting profile 26 of face mill cutter 27 as the latter rotates about its axis 28. The cutter has a tip cutting profile 29 for cutting the bottom of the tooth spaces, this profile merging through a radius 31 into the side cutting profile 26. Adjacent the latter is a chamfering profile 32 for chamfering the teeth 22 at the junctures of their flanks and tops. The profile 33 of the cutter that is opposite to side cutting profile 26 is known as the clearance side profile, and preferably it does not contact the work. As the cutter rotates during the cutting operation, a depthwise relative feed motion of the cutter and work is effected, and after the cut has reached full depth the cutter is relatively withdrawn and the work is indexed about its axis 24 to bring the next tooth space into cutting position. This process is repeated until all of the teeth have been cut.

The teeth 23 of the member 21 are cut similarly with side cutting and tip cutting profiles, 34 and 35 respectively, of a circular mill cutter 36 rotating about its axis 37, with opposite sides of spaced teeth 23' and 23" simultaneously lying the in the circular path 38 of the side cutting profile 34. The cutter 36 has a tip cutting radius 39 between its side and tip cutting profiles, a chamfering profile 41 at the inner end of its side cutting profile, and, opposite the latter, a clearance side profile 42.

The term "profile" as herein applied to the cutter refers to the line of intersection between a plane axial of the cutter and a surface of revolution generated by an edge of the cutter blade as the cutter rotates, and is to be distinguished from an actual edge of the blade which may or may not lie in such an axial plane. In the detail views, Figs. 8 and 9, of one of the blades of cutter 27, the side cutting edge which represents the side cutting profile 26 is designated 43. Similarly tip cutting and clearance side edges designated 44 and 45 respectively, represent the corresponding profiles 29 and 33. The edge representing the chamfering profile 32 is provided on a cutter blade separate in the illustrated embodiment, and hence it does not appear in Figs. 8 and 9. The cutter blade shown is relieved back of its cutting edges 43 and 44 in an axial direction, the relief angle as measured from line 47, which represents the plane of cutter rotation, being designated A. With this kind of relief, when the blade is sharpened back to bring the edge 43 to successive positions indicated by broken lines 43' and 43" in Fig. 8, the cutting edges remain at the same radial distance from the axis 28 of the cutter. However the cutter blade cannot be relieved in this manner back of its clearance edge 45, and hence, as will be seen from Fig. 9, the tip of the blade (along edge 44 or profile 29) becomes narrower as the blade is sharpened back.

Figure 7:
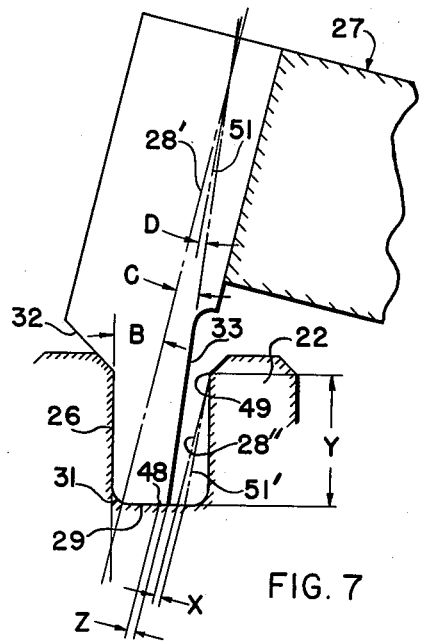
Fig. 7 is a fragmentary section in the plane containing the cutter axis and indicated by line 7—7 of Fig. 3 and with the blade profiles of the cutter disposed in this plane.

In order to provide such axial relief it is of course necessary that the profile 26 be disposed at an angle, known as the pressure angle, to the cutter axis. In Fig. 7 the line 28' extends in the direction of the cutter axis and the pressure angle of the profile 26 is the acute angle designated B. In the example illustrated this angle is approximately thirteen degrees. The clearance side profile is disposed at an acute negative angle C to the cutter axis.

For the purpose of avoiding a fin on the bottom of each tooth space, it is necessary that the tip cutting profile 29 sweep at least half the width of the tooth space bottom at its widest point, that is, at a point near the longitudinal center of the bottom in the case of member 20 and, in the example shown, at the outer end of the bottom in the case of member 21. In Fig. 7 the center of the bottom is designated 48, and the cutter tip overlap, measured radially of the cutter, is designated Z. The depth of cut Y, measured from the bottom edge 49 of the chamfer, is limited by the necessity of the cutter profile 33 clearing the edge 49, at the point where the tooth space is narrowest, when the cutter is at full depth.

Figures 8, 9:
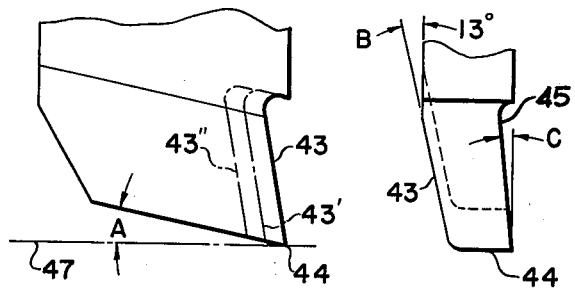
Figs. 8 and 9 are respectively side and front views of one blade of the cutter shown in Figs. 3, 4, and 7.

According to conventional practice the feed motion of the cutter relative to the work is in the direction of the cutter axis 28 (or 37). The negative angle C is ordinarily on the order of three degrees in order to provide adequate clearance between profile 33 and the work as the depth feed proceeds. The amount that a blade can be sharpened back, as measured along line 47 of Fig. 8, is $$\frac{Z}{\tan A \tan C}$$

Thus if Z is 0.005 inch, and A is twelve degrees and C three degrees, the blade can be sharpened back only 0.449 inch.

According to the present invention the angle C is preferably increased by a substantial amount and the relative feed motion of the cutter and work is effected in a direction, designated 51 in Figs. 4 and 7, that is inclined to both the cutter axis and the work axis. The feed direction is inclined to the axis 24 of the work in the same sense as, but to a lesser degree than, the cutter axis 28; and is in substantially the direction which the clearance side profile extends in the plane common to these axes 24 and 28 (the plane of Fig. 4). More specifically, the feed is effected in this common plane at an angle to the cutter axis that is equal to the angle C which the clearance side profile makes with the cutter axis less a small clearance angle D that is provided to enable the clearance side profile to clear the work as the feed proceeds.

The present invention makes possible a substantial increase in the depth of cut Y for a given tooth space width without mutilation of the finished tooth profile at the point where the tooth space is narrowest. In Fig. 7 lines 51' and 28" are drawn through point 49, with 51' extending in the direction of line 51 and 28" in the direction of the cutter axis 28, and from this will be seen that the tooth space may be increased in width by an amount designated X.

Figure 10:
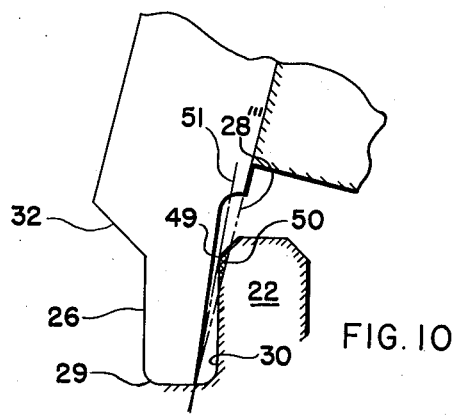
Fig. 10 is a fragmentary section in the plane containing the cutter axis and indicated by the line 10—10 in Fig. 3.

By way of further explanation on this point, reference is made to Figs. 3 and 10. The circular arc 25' in Fig. 3 represents the path of the clearance side profile 33 of the cutter. It will be seen that the maximum width of the cutter is determined by the necessity of the profile 33 clearing the inner end of the adjacent tooth, designated 30 in Fig. 3, where the tooth space is narrowest. From Fig. 10, which is a section taken at the inner end 30, it will be seen that when the feed is along line 51' the inner point of the cutter (at the juncture of profiles 29 and 33) will just touch edge 49. The point width of the cutter, that is the cutter width along profile 29, is the maximum that can be employed for this particular tooth space width. If the feed were in the direction employed heretofore, that is in the direction of the cutter axis represented in this view by line 28''', the inner point of the cutter as it fed past edge 49 would cut away the cross-hatched corner 50 of the tooth. To prevent such mutilation of the teeth it would be necessary, if a feed in the direction of the cutter axis were employed, to reduce the cutter point width by the amount X from the width that is made possible by the present invention.

Instead of the invention being employed to increase the depth of cut relative to the tooth space width, it may be used to enable the width of the cutter to be increased by this amount X. If, for example, with the present invention the angle C is six degrees, and a clearance angle D of three degrees is provided, then assuming the value of Y to be 0.500 inch, the increase X in cutter width will be approximately 0.500 tan 3°, or 0.026 inch. The amount that the blades can be sharpened back $$\frac{Z}{\tan A \tan C}$$

now becomes $$\frac{0.005+0.026}{\tan 12° \tan 6°}$$

or 1.38 inches, as compared with only 0.449 inch with the prior method. It will be understood that the direction of feed lies in the plane of Fig. 4 and that the feed directions indicated in Figs. 7 and 10 are projections into the respective planes of these views. The values mentioned for D and X are those which would exist in the plane of Fig. 3, which is common to the cutter and work axes and the direction of feed.

Figure 11:
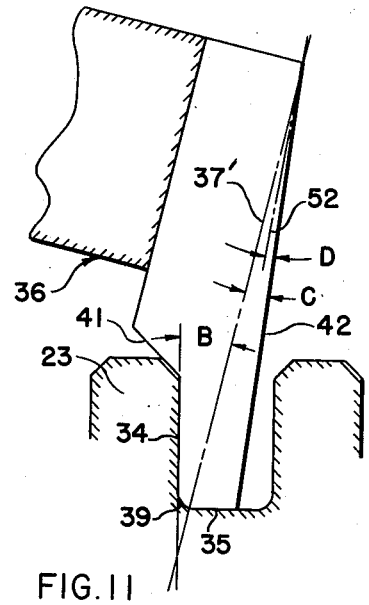
Fig. 11 is a view similar to Fig. 7, but being taken in the plane indicated by line 11—11 of Fig. 5 to show the relationship of the inside cutter and the convex toothed coupling member.

In Fig. 11 the line 37' is parallel to the cutter axis 37 and the direction of relative feed motion of the cutter 36 and work 21 is indicated by the line 52. As in Fig. 7, B designates the pressure angle of the side cutting profile, which in this case is the inside profile 34 of the cutter, C designates the negative angle between the clearance side profile 42 and the cutter axis, and D the clearance angle between the direction of feed 52 and the clearance side profile. The values of these angles may be the same as those in Fig. 7.

Figure 12:
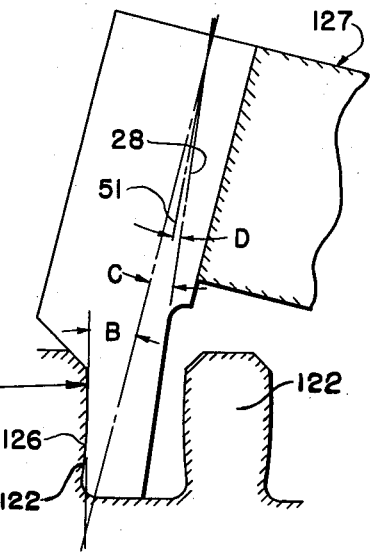
Fig. 12 is a view similar to and in the same plane as Fig. 7 but illustrating the cutting of the concave toothed member with a crowned tooth profile.

Fig. 12 illustrates the application of the invention to the manufacture of a clutch or coupling member wherein the teeth 122 are crowned in side profile, to accommodate slight angular misalignment of mating members. The cutter 127 may be identical with that designated 27 in Fig. 7 except that its side cutting profile 126 is of circular arc form, the center of curvature being indicated at 130. The radius of curvature of the cutting profile 126 is so large as to not interfere with feed in the direction 51.

The foregoing disclosure is made by way of example to illustrate and explain the inventive principles involved, and not by way of limitation, there being no intention to limit the scope of the invention except as may be required by the appended claims.

I claim as my invention:

1. The method of cutting a face toothed member, whose tooth profiles extend in a substantially axial direction, comprising rotating a face mill cutter that has a tip cutting profile, a side cutting profile and a clearance side profile, the clearance side profile being disposed at an acute negative angle to the axis of the cutter, with the axis of the cutter disposed at an acute angle to the axis of the member being cut and effecting a relative feed motion of the cutter and the member substantially in the direction of the clearance side profile in the plane common to said axes.

2. The method of cutting a face toothed member, whose tooth profiles extend in a substantially axial direction, comprising rotating a face mill cutter that has a tip cutting profile, a side cutting profile and a clearance side profile, the clearance side profile being disposed at an acute negative angle to the axis of the cutter, with the axis of the cutter disposed at an acute angle to the axis of the member being cut and effecting a relative feed motion of the cutter and the member in a direction in the plane of said axes that is inclined to the axis of the member in the same sense as, but to a lesser degree than, the cutter axis, the direction of the feed motion being at an angle to the cutter axis that is equal to said negative angle less a clearance angle.

3. The method of cutting a face toothed member, whose tooth profiles extend in a substantially axial direction, comprising rotating a face mill cutter that has a tip cutting profile, a side cutting profile and a clearance side profile, the clearance side profile being disposed at an acute negative angle to the axis of the cutter, with the axis of the cutter disposed to intersect the axis of the member being cut at an acute angle and effecting a relative feed motion of the cutter and the member in a direction that extends in the plane of said axes and that is inclined to the axis of the member in the same sense as the cutter axis, the direction of the feed motion being at an angle to the cutter axis no greater than said negative angle.

References Cited in the file of this patent

UNITED STATES PATENTS 2,334,366    Wildhaber _____ Nov. 16, 1943